March 17, 1925.
A. B. WEBB
TRACTOR SNOWPLOW
Filed April 17, 1922
2 Sheets-Sheet 1
1,529,678
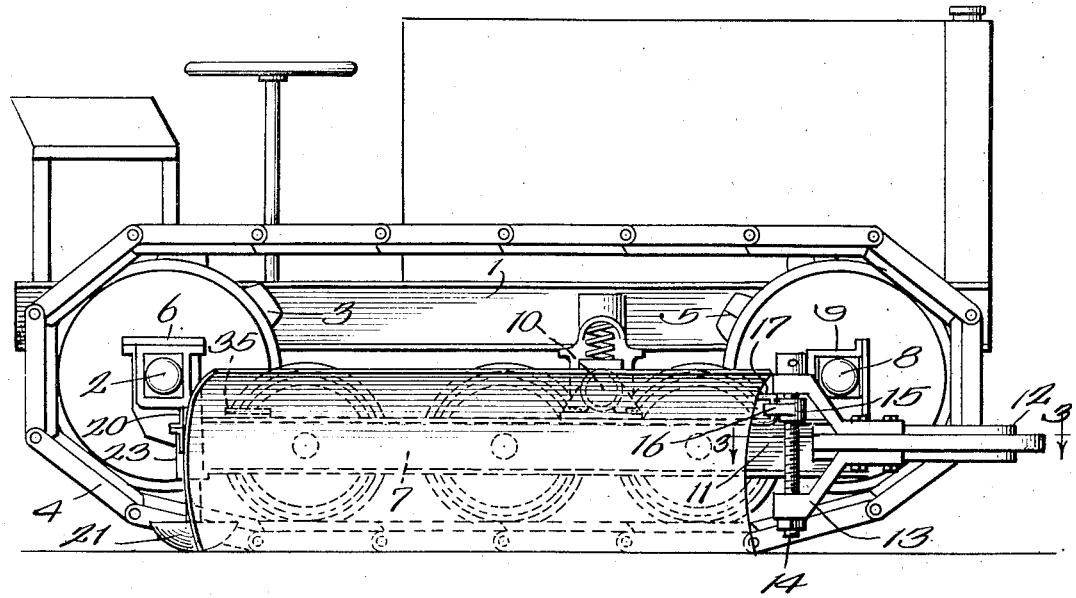
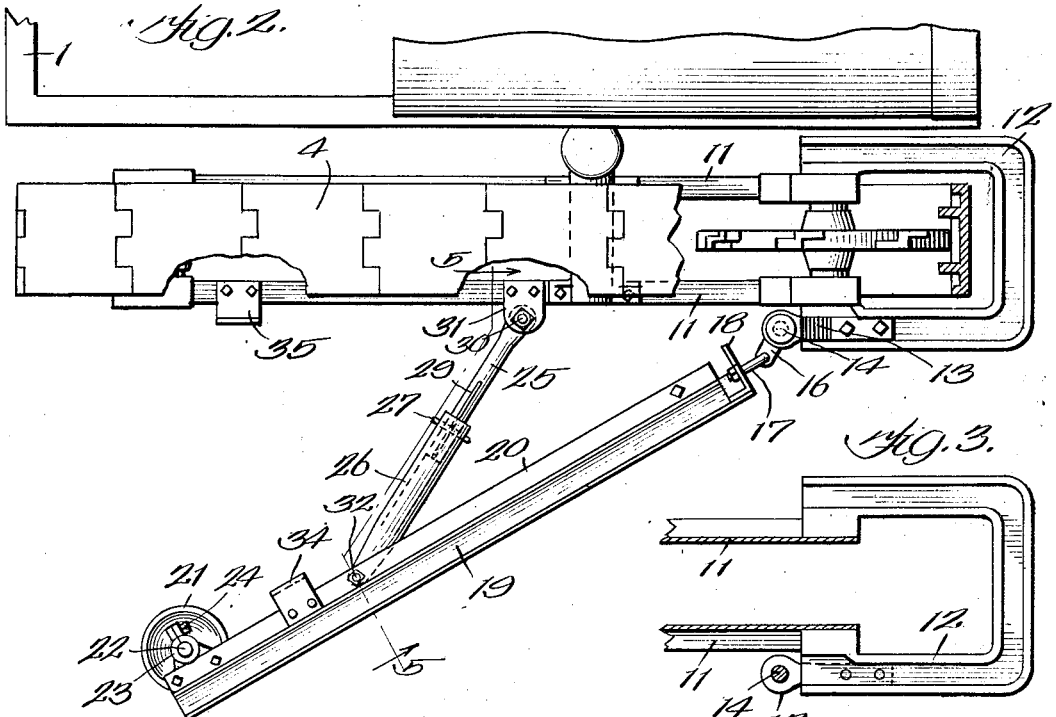
Inventor:
Arthur B. Webb

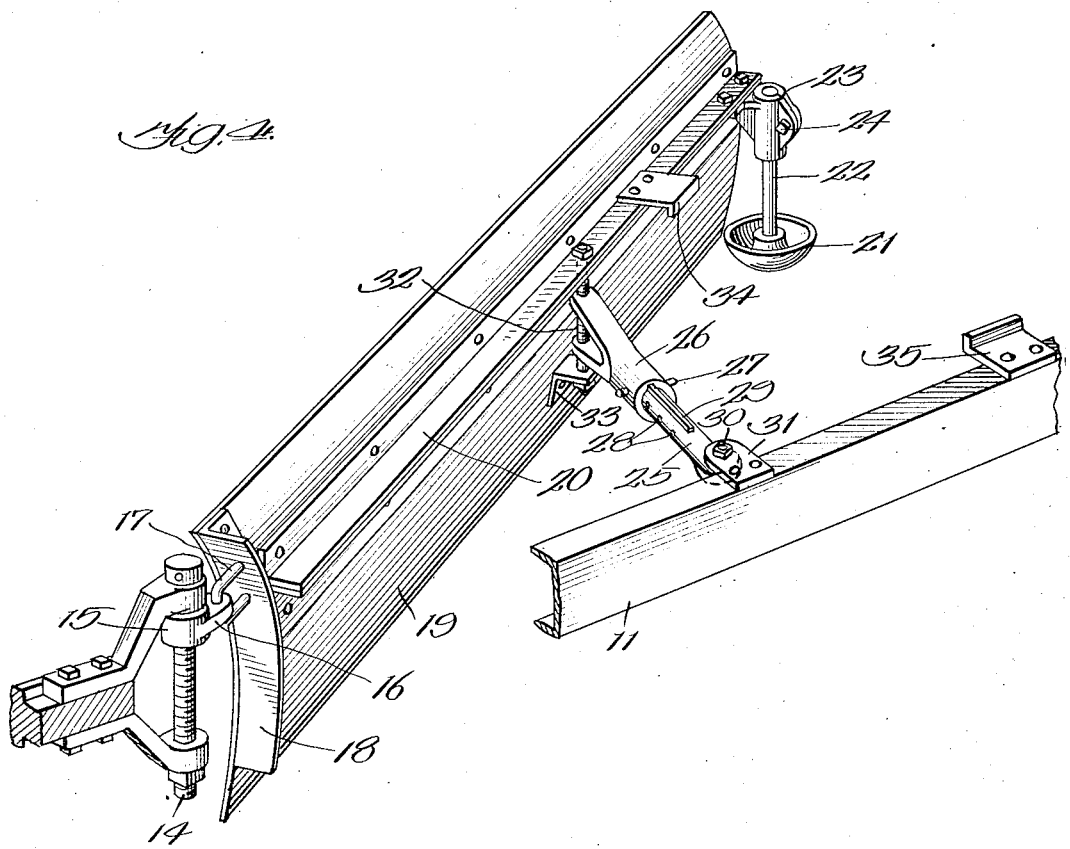
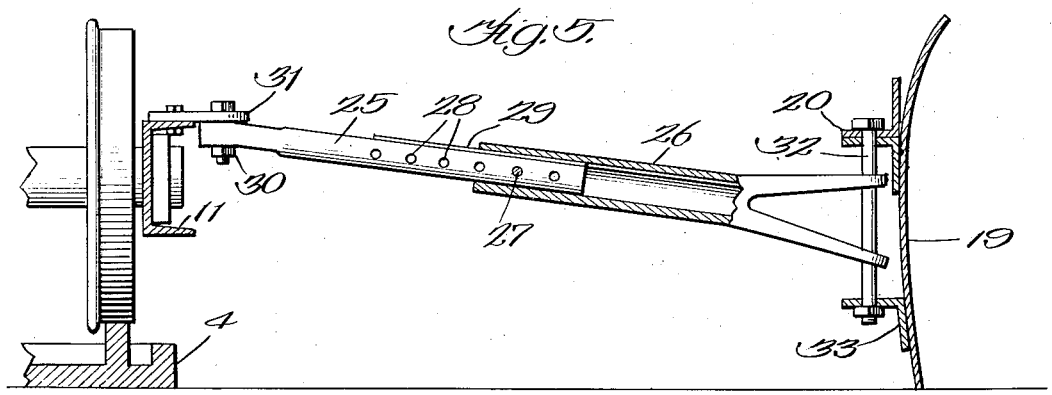

Patented Mar. 17, 1925.

1,529,678

UNITED STATES PATENT OFFICE.

ARTHUR B. WEBB, OF WATERTOWN, WISCONSIN, ASSIGNOR TO MONARCH TRACTORS INCORPORATED, OF WATERTOWN, WISCONSIN, A CORPORATION OF DELAWARE.

TRACTOR SNOWPLOW.

Application filed April 17, 1922. Serial No. 554,329.

*To all whom it may concern:*

Be it known that I, ARTHUR B. WEBB, citizen of the United States, residing at Watertown, in the county of Jefferson and State of Wisconsin, have invented a certain new and useful Improvement in Tractor Snowplows, of which the following is a full, clear, concise, and exact description.

My invention relates to endless track tractors employing truck frames which support wheels that define the orbits for the endless tracks, these truck frames usually also carrying idler wheels that engage the lower stretches of the tracks to preserve them in proper tractive engagement with the ground.

The invention resides in attaching a road scraping blade to the truck frame of such a tractor to constitute such a tractor a road scraper or snow plow. The invention will be fully explained in connection with the accompanying drawings in which Fig. 1 is a side view illustrating one form of tractor with a blade assembled with the truck frame thereof in accordance with the preferred form of the invention; Fig. 2 is a plan view of one side of the tractor illustrated in Fig. 1, certain parts being removed for the sake of clearness; Fig. 3 is a plan view, partially in section, illustrating a part of the truck frame; Fig. 4 is a perspective view illustrating the blade supporting portion of the truck frame, this figure looking toward the inner side of the blade and the part of the truck frame with which the blade is assembled; and Fig. 5 is a sectional view on line 5—5 Fig. 2.

Like parts are indicated by similar characters of reference throughout the different figures.

A complete illustration of the tractor is unnecessary to an understanding of the invention, wherefore the drawings show only a part of the main tractor frame 1 that supports the power plant and serves other purposes as is well understood by those skilled in the art.

The engine or motor upon the tractor frame is in suitable driving connection with a driving shaft 2 of the tractor upon which is mounted the driving sprocket wheel 3 that is employed for effecting the propulsion of each endless truck chain track 4. The driving sprocket wheel 3 is illustrated at the rear of the tractor, there being an idler sprocket wheel 5 at the forward end of the tractor that is complemental to each of such driving sprocket wheels. The shaft 2 of the wheels 3 is within bearings 6 that are carried upon truck frames 7. The shaft 8 of the wheels 5 is disposed within bearings 9 that are also carried upon said truck frames. Each truck frame is mounted to swing upon the shaft 10 that is hung upon and beneath the main frame 1, the truck frames upon the opposite sides of the main frame being capable of independent swinging movements upon this shaft.

Each truck frame is desirably formed of suitably connected channel irons 11 that extend longitudinally of the tractor. The forward ends of the channel irons of each truck frame are desirably further connected by a suitable form of bumper 12. A yoke 13 is anchored to the outer bumper 12 that is mounted upon the channel iron 11 at the forward end thereof. This yoke is of Y-form having vertically aligned openings in the spread apart ends thereof through which a bolt 14 is loosely passed being free of threaded engagement therewith. A nut 15 is threaded upon the bolt and carries an ear 16 through which a U-bolt 17 is loosely passed. This U-bolt is carried upon the upright web 18 that is fastened to and projects laterally from the blade 19 at the forward end thereof. By turning the bolt 14 the vertical position of the nut 15 is determined thereby to define the upright position of the blade. Another web 20 is also provided upon the blade, this web 20, as well as the web 18, being upon the convex face of the blade. The web 20 extends longitudinally of the blade and projects laterally therefrom.

A foot 21 is assembled with the blade at the rear end thereof and co-operates with the joints at 16, 17 in defining the upright position of the blade with respect to the ground. This foot is shown in the nature of a curved button whose convex side bears upon the ground, this button being fixed upon a stem 22 that is received in an upright socket 23 which is carried upon the rear end of the web 20. A set bolt 24 serves to hold, when tightened, the foot 21 and its stem 22 in the position to which these parts are raised when said bolt is loose. A strut is connected between a mid portion of the longitudinal web 20 and the contiguous rail 11 of the adjacent truck frame, this strut having its effective length adjustable to adjust the angularity of the blade to the tractor frame. As illustrated, this strut is composed of a rod 25 that is in telescoping engagement with a sleeve 26, a pin 27 passing through holes in said sleeve and through selected holes 28 in the rod to hold the sleeve and rod in the relative positions in which they are placed to adjust the effective length of the strut composed by these elements. To reduce the shearing effect upon the pin and to maintain the holes in the rod 25 and sleeve 26 in the same plane, said rod and sleeve may have splined connection as indicated at 29. The rod 25 at one end of the strut is pivotally connected at 30 with an ear 31 that is bolted to the contiguous truck frame member 11. The sleeve 26 at the other end of the strut is desirably bifurcated, the forked branches of this sleeve having smooth vertically aligned openings through which the upright guide bolts 32 is passed, this guiding bolt being positioned by the web 20 and the lug 33 through which it passes.

When the blade of the tractor is operative, the strut 25, 26 is elongated sufficiently to place the blade at the requisite angle to the track. When the blade is to be placed out of service the forward end thereof is elevated by turning the rod 14, the strut is shortened sufficiently to bring the blade in substantial parallelism with the tractor, and the downwardly projecting L-shaped lug 34 upon the blade is hooked into engagement with the upwardly projecting lug 35 that is carried upon the adjacent truck frame side 11. The lug 35 serves sufficiently to elevate the rear end of the blade while folded back out of use while the interengaging free ends of these lugs hold the blade in its folded position.

While I have herein shown and particularly described the preferred embodiment of the invention I do not wish to be limited to the precise details of construction shown as changes may readily be made without departing from the spirit of my invention, but having thus described my invention I claim as new and desire to secure by Letters Patent the following:—

1. A tractor including an endless chain track; a truck frame; wheels upon the truck frame over which said track passes; in combination with a scraping blade swingingly mounted at its forward end upon the forward portion of the truck frame; a foot upon the rear end of the scraping blade; and interengageable formations upon the scraping blade and upon the truck frame for holding the scraping blade when folded toward the tractor.

2. A tractor including an endless chain track; a truck frame; wheels upon the truck frame over which said track passes; in combination with a scraping blade swingingly mounted at its forward end upon the forward portion of the truck frame, the place of connection of the forward end of the scraping blade being vertically adjustable; and interengageable formations upon the scraping blade and upon the truck frame for holding the scraping blade when folded toward the tractor.

3. A tractor including an endless chain track; a truck frame; wheels upon the truck frame over which said track passes; in combination with a scraping blade swingingly mounted at its forward end upon the forward portion of the truck frame; a strut connecting an intermediate portion of the scraping blade with the truck frame; and interengageable formations upon the scraping blade and upon the truck frame for holding the scraping blade when folded toward the tractor.

4. A tractor including an endless chain track; a truck frame; wheels upon the truck frame over which said track passes; in combination with a scraping blade swingingly mounted at its forward end upon the forward portion of the truck frame, the place of connection of the forward end of the scraping blade being vertically adjustable; a strut connecting an intermediate portion of the scraping blade with the truck frame; and interengageable formations upon the scraping blade and upon the truck frame for holding the scraping blade when folded toward the tractor.

5. A tractor including an endless chain track; a truck frame; wheels upon the truck frame over which said track passes; in combination with a scraping blade swingingly mounted at its forward end upon the forward portion of the truck frame; a strut connecting an intermediate portion of the scraping blade with the truck frame; means whereby the effective length of said strut may be varied; and interengageable formations upon the scraping blade and upon the truck frame for holding the scraping blade when folded toward the tractor.

6. A tractor including and endless chain track; a truck frame; wheels upon the truck frame over which said track passes; in combination with a scraping blade swingingly mounted at its forward end upon the forward portion of the truck frame, the place of connection of the forward end of the scraping blade being vertically adjustable; a strut connecting an intermediate portion of the scraping blade with the truck frame; means whereby the effective length of said strut may be varied; and interengageable formations upon the scraping blade and upon the truck frame for holding the scraping blade when folded toward the tractor.

In witness whereof, I hereunto subscribe my name this first day of March A. D., 1922.

ARTHUR B. WEBB.